D. M. WINANS.
FASTENER FOR AUTOMOBILE AND VEHICLE CURTAINS.
APPLICATION FILED DEC. 21, 1916.
1,228,627.
Patented June 5, 1917.
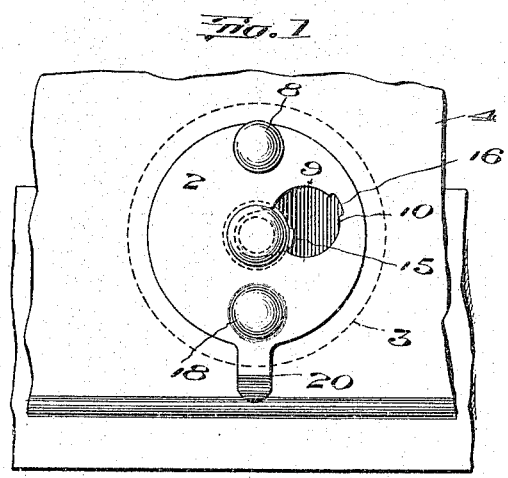
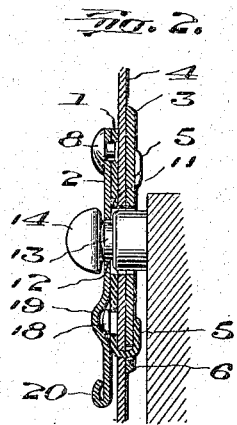
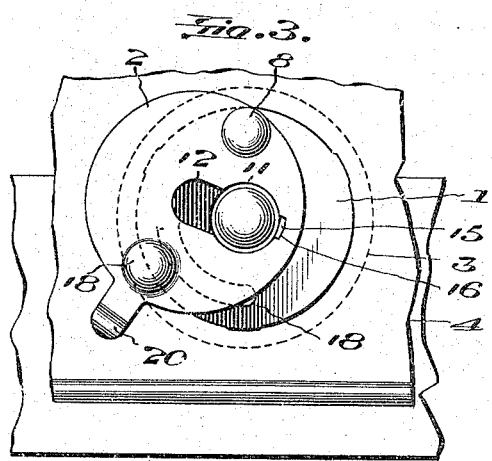
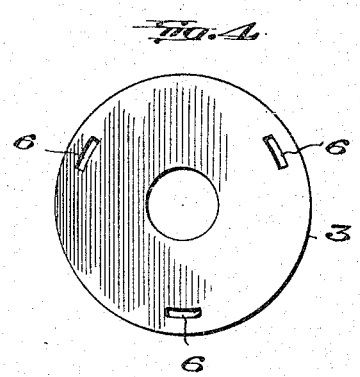
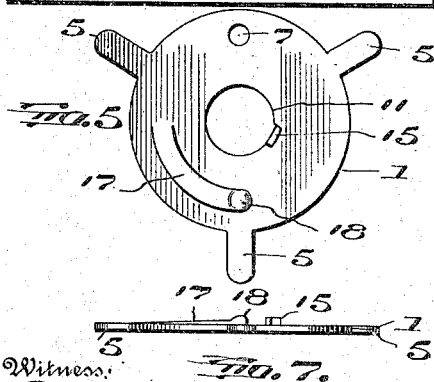
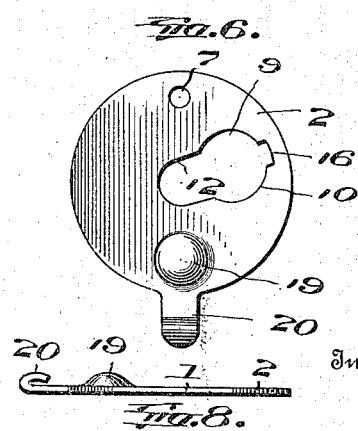
Witness:
Philip E. Barnes
Inventor
Daniel M. Winans
Attorney

UNITED STATES PATENT OFFICE.

DANIEL M. WINANS, OF BINGHAMTON, NEW YORK, ASSIGNOR TO CRANDAL, STONE & CO., OF BINGHAMTON, NEW YORK, A CORPORATION OF NEW YORK.

FASTENER FOR AUTOMOBILE AND VEHICLE CURTAINS.

1,228,627.    Specification of Letters Patent.    Patented June 5, 1917.

Application filed December 21, 1916. Serial No. 138,177.

*To all whom it may concern:*

Be it known that I, DANIEL M. WINANS, a citizen of the United States, residing at Binghamton, county of Broome, and State of New York, have invented certain new and useful Improvements in Fasteners for Automobile and Vehicle Curtains, of which the following is a specification.

This invention relates to fasteners for automobile and vehicle curtains and has for its object the provision of a neat, inconspicuous device of improved construction which can be readily opened or closed and will remain securely fastened, adapted for use in connection with the small studs necessitated by present methods of automobile body construction.

My improvements minimize the number of parts, reduce the cost of manufacture, enable the fastener to be made small, flat and inconspicuous, and dispense with turn-buttons or spring-snap constructions and afford a positive mechanical locking action with the stud which cannot become accidentally unfastened.

One embodiment of the invention is hereinafter set forth and is shown in the accompanying drawings, in which:

Figure 1, is a front elevation showing the fastener applied to the curtain and in locked condition;

Fig. 2, a vertical section therethrough;

Fig. 3, a front elevation, the stud being omitted, and the fastener in unlocked condition;

Fig. 4, a detail face view of the washer;

Fig. 5, a similar view of the base plate or disk;

Fig. 6, a similar view of the locking disk;

Fig. 7, an edge view of the base plate or disk;

Fig. 8, a similar view of the locking disk.

The fastener comprises a base plate or disk 1, locking plate or disk 2 and the usual reinforcing washer 3, located on the inner side of the curtain 4.

The disk 1 and washer 3 may be fastened together by prongs 5 integral with disk 1 and passing through the curtain 4 and slots 6 in washer 3 and clenched down on the latter in a well-known manner; other connections may be used for this purpose.

The disks or plates 1, 2, have holes 7 to receive a rivet 8 by which the locking disk 2 is pivotally or swingingly connected to the disk 1.

The locking disk 2 has a key-hole slot or opening 9 whose larger portion 10 is of the same size as the stud hole or opening 11 in plate 1 and is adapted to register therewith when the disk 2 is swung to one side. When the disks are in coincidence, the narrower portion 12 of the slot 9 engages the groove 13 in the stud 14. The stud 14 may be of any of the forms commonly used which are fastened to the vehicle or automobile body by a screw threaded shank, or a base plate and screws.

To insure accurate registry of the openings 10 and 11, the base plate or disk 1 has a struck-up lip or stop 15 at the margin of opening 11 and there is provided an offset notch 16 in the margin of opening 10 to receive said stop.

The base plate 1 has a struck-up spring tongue 17 provided with a rounded nib or hump 18 adapted to snap into a struck-up concavity 19 in the underside of locking disk 2 when the disks 1, 2 are in coincidence. The smaller portion 12 of the slot 9 is in locked engagement with the groove 13 of stud 14 when the nib 18 is in concavity 19 and cannot become accidentally disengaged, as the inherent springiness of the tongue 17 keeps the nib 18 firmly seated in concavity 19.

The disk 2 has a projection 20 serving as a finger hold for swinging the disk into open, or locked position.

When the disk 2 is in the position shown in Fig. 3, the stud 14 can be inserted into, or removed from, openings 10, 11 but when in the locked position of Figs. 1, 2, the stud is securely held by the margin of the narrower part 12 of slot 9.

Having thus described my invention, what I claim as new and desire to secure by Letters Patent, is:

1. A fastener for automobile and vehicle curtains comprising a base plate having a stud-receiving opening, a movably mounted locking plate carried thereby provided with a key-hole slot, the parts of which may be brought into or out of line with the stud-receiving opening on moving the locking plate, a spring catch on one of said plates, and a concavity in the body of the locking plate adapted to receive the spring catch when the locking plate is in locking position, to thereby secure the latter.

2. A fastener for automobile and vehicle curtains comprising a base plate having a stud-receiving opening, a movably mounted locking plate carried thereby provided with a closed key-hole slot, the parts of which may be brought into or out of line with the stud-receiving opening on moving the locking plate, and a stop on the base plate which is received in the key hole slot and is adapted to engage the margin of the latter to limit movement of the locking plate to cause the larger portion of the key-hole slot to register with the stud-receiving opening.

3. A fastener for automobile and vehicle curtains comprising a base plate having a stud-receiving opening, a locking plate pivoted to the base plate so as to be adapted to swing in a plane parallel thereto and provided with a key-hole slot, the parts of which may be brought into or out of line with the stud-receiving opening on swinging the locking plate, one of the said plates being provided with a struck-up spring tongue and the other plate a depression or concavity adapted to receive said tongue to secure the locking plate in locking position, there being also provided on one of the plates at the margin of the opening therein a struck-up lip or stop and at the margin of the opening on the other plate a notch to receive said lip or stop whereby the locking plate is arrested when the larger portion of the key-hole slot is in register with the stud-receiving opening.

In testimony whereof, I hereunto affix my signature.

DANIEL M. WINANS.

Copies of this patent may be obtained for five cents each, by addressing the "Commissioner of Patents, Washington, D. C."